United States Patent
Clark et al.

(10) Patent No.: US 8,433,851 B2
(45) Date of Patent: Apr. 30, 2013

(54) REDUCING WIRING CONGESTION IN A CACHE SUBSYSTEM UTILIZING SECTORED CACHES WITH DISCONTIGUOUS ADDRESSING

(75) Inventors: Leo James Clark, Kerrville, TX (US); James Stephen Fields, Jr., Austin, TX (US); Guy Lynn Guthrie, Austin, TX (US); William John Starke, Round Rock, TX (US); Derek Edward Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 11/839,663

(22) Filed: Aug. 16, 2007

(65) Prior Publication Data

US 2009/0049248 A1 Feb. 19, 2009

(51) Int. Cl.
*G06F 12/08* (2006.01)

(52) U.S. Cl.
USPC .................................. 711/128; 711/E12.018

(58) Field of Classification Search .......................... None
See application file for complete search history.

(56) References Cited

U.S. PATENT DOCUMENTS

| | | | | |
|---|---|---|---|---|
| 5,519,841 A * | 5/1996 | Sager et al. | ................... | 711/202 |
| 5,553,259 A * | 9/1996 | Kalish et al. | ...................... | 711/3 |
| 6,301,647 B1 * | 10/2001 | Green | ........................... | 711/207 |
| 6,332,179 B1 | 12/2001 | Okpisz et al. | | |
| 2004/0215886 A1 * | 10/2004 | Cargnoni et al. | ............. | 711/135 |
| 2006/0179229 A1 | 8/2006 | Clark et al. | | |
| 2006/0179230 A1 * | 8/2006 | Fields et al. | ................... | 711/129 |
| 2007/0043911 A1 | 2/2007 | Hetherington et al. | | |

FOREIGN PATENT DOCUMENTS

| JP | 2007509439 A | 4/2007 |
|---|---|---|
| WO | 2005014047 | 5/2005 |
| WO | 2005/041047 | * 6/2005 |

OTHER PUBLICATIONS

International Search Report, PCT/EP2008/059902, Oct. 24, 2008, ISA, EPO.

* cited by examiner

*Primary Examiner* — Edward Dudek, Jr.
*Assistant Examiner* — Ryan Dare
(74) *Attorney, Agent, or Firm* — Yudell Isidore Ng Russell PLLC

(57) ABSTRACT

A method and computer system for reducing the wiring congestion, required real estate, and access latency in a cache subsystem with a sectored and sliced lower cache by re-configuring sector-to-slice allocation and the lower cache addressing scheme. With this allocation, sectors having discontiguous addresses are placed within the same slice, and a reduced-wiring scheme is possible between two levels of lower caches based on this re-assignment of the addressable sectors within the cache slices. Additionally, the lower cache effective address tag is re-configured such that the address fields previously allocated to identifying the sector and the slice are switched relative to each other's location within the address tag. This re-allocation of the address bits enables direct slice addressing based on the indicated sector.

20 Claims, 10 Drawing Sheets

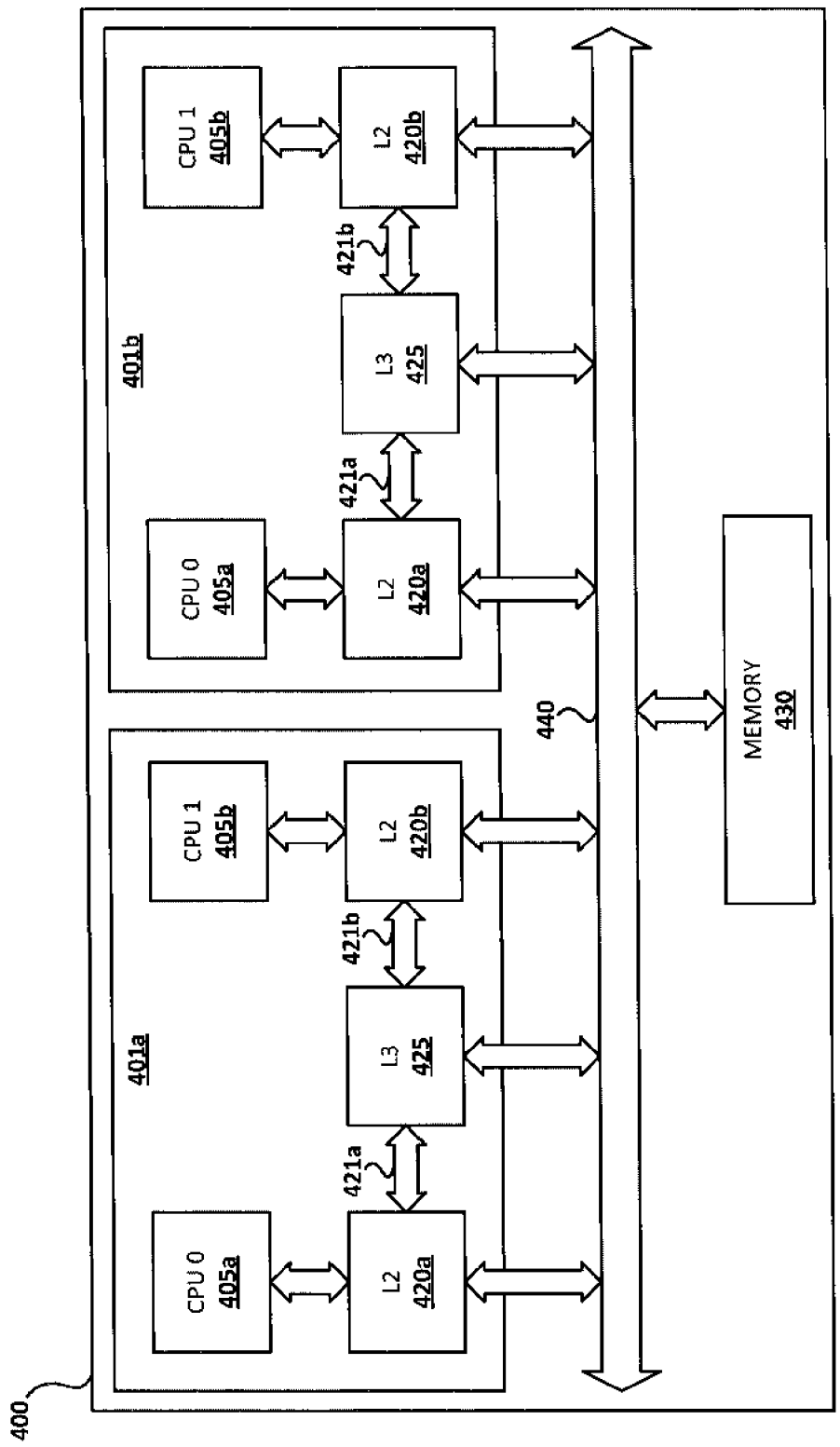

REDUCING WIRING CONGESTION IN A CACHE SUBSYSTEM UTILIZING SECTORED CACHES WITH DISCONTIGUOUS ADDRESSING

BACKGROUND OF THE INVENTION

1. Technical Field

The present invention relates generally to data processing systems and more specifically to cache mechanisms within data processing systems. Still more particularly, the present invention relates to cache sector allocation within cache slices of a multi-sectored cache.

2. Description of the Related Art

A conventional multiprocessor data processing system may comprise a number of processing units, a system memory, and one or more levels of cache memory coupled between the processing units and the memory. Caches are temporary storage facilities utilized to store subsets of the overall memory of a data processing system at varying latencies. The various caches are configured in a cache hierarchy, defined as levels, relative to the processing units. At the various levels of the cache hierarchy, a tradeoff is made between the size and the access latency of the cache. Those skilled in the art are familiar with the notion of a multi-level cache hierarchy that optimizes the access latency and size characteristics of the various cache hierarchy levels according to available implementation technologies, leading to optimal system performance.

A cache, at a given level of hierarchy, typically comprises a number of components, including a cache directory array, a cache data array, and functional logic units necessary to update and manage the cache. The cache data array portion of a cache is a set of data storage elements utilized to store copies of portions of main memory. The cache data array is divided into a series of so called "cache blocks". These cache blocks are storage regions utilized to hold copies of contiguous portions of the main memory within the data processing system. These blocks are typically on the order of 128 bytes in size and are a size that is a power of two.

In the following description, a cache block size of 128 bytes will be assumed. Those familiar with the art will be able to apply the invention to data processing systems with other cache block sizes. Further, portions of memory that are copied into cache blocks are also aligned. In other words, the starting address of a contiguous portion of memory that is mapped into a cache block is an integer multiple of the cache block size.

Typically, the data array portion of a cache is organized as an M×N matrix of cache blocks. Each row of the matrix is referred to as a "congruence class" and the number of congruence classes is typically a power of two. Within a given congruence class, N blocks are provided to hold copies of contiguous portions of main memory. Caches with N blocks in a congruence class are referred to as N-way set associative caches.

Each location in main memory is mapped, by cache blocks, to reside within a particular congruence class within a cache. The low order bits of the main memory address (seven bits for a 128 byte cache line) indicate which byte within a cache line is being accessed and do not affect the mapping of the cache block to a congruence class. The next most significant $\log_2$ (M) bits of the address are known as the "congruence class address". These address bits are used to index into the M rows of the cache. A cache block sized and aligned portion of memory may reside in any of the N blocks (entries) within the addressed congruence class. The remaining high order bits within the address are called the "tag" and are used to distinguish between the different blocks of main memory that may be allocated within a congruence class.

With reference now to FIG. 1A, there is shown a depiction of how the bits constituting a main memory address are interpreted to determine where a main memory location may be mapped within a cache for a system with a 64 bit address and a cache with 4096 congruence classes of 128 byte cache lines. The low order seven bits (bits 57 to 63) in field 103 indicate a byte within the cache line corresponding to this address. Since this field addresses bytes within a cache line, it is ignored when determining where the cache block may reside within the cache.

The next twelve bits (bits 45 to 56) in congruence class address field 102 indicate the congruence class within the cache this memory address maps to. The cache block containing this address may reside in any of the N blocks within the addressed congruence class. Finally, the remaining bits of the address (bits 0 to 44) in field 101 are referred to as the "tag" of the memory block.

In order to record which portions of main memory are present in a cache, a cache includes an M×N entry cache directory array. Each entry within this cache directory array corresponds directly to one entry in the M×N cache data array and indicates which portion of main memory is mapped to the corresponding entry of the cache data array and the state of the cache line at that entry.

With reference now to FIG. 1B, there is shown a depiction of a cache directory entry. The tag field 104 consists of the tag portion of the address of the block of main memory that is mapped to this entry within the cache. State field 105 contains the state of the cache block mapped to this entry. In the depicted embodiment, four bits are used to provide for up to 16 possible cache states. One of these states indicates that the line is "invalid". In the presence of an invalid state, the value within the tag field for this directory entry is ignored because this entry in the cache is not active (this qualification is necessary because some value is always present in the tag field irrespective of whether the corresponding portion of memory has actually been populated within the cache entry).

To determine if a particular address is present within a cache, the tag portion of that address is compared to the N tag entries (tag field 104) within the congruence class associated with that address, ignoring those entries that are marked as invalid by state field 105. If a valid matching entry is found, the line is present in the cache. When a portion of main memory is installed within a cache block, the directory entry for the block is updated to indicate a non-invalid state and the tag portion of the memory block address is placed within tag field 104. When a block is de-allocated from the cache, state field 105 is set to invalid and the cache data (if necessary for coherency reasons) may be written back to main memory or another cache.

With reference now to FIG. 1C, there is shown a depiction of a cache according to the above description. Cache 110 consists of cache data array 120, cache directory array 130, and cache control logic 126b. Cache data array 120 consists of congruence classes 122 consisting of cache members 124. Cache directory array 130 is organized similarly to cache data array 120 as described above.

The foregoing has described a single cache structure that can map the entirety of main memory using a single cache structure consisting of a cache directory array, a cache data array, and a set of control logic to manage updates to the cache. However, in order to increase parallelism, a cache is often "sliced". In a sliced cache, each slice contains a cache data array, cache directory array, and control logic. Typically, in a sliced cache with S slices, each slice is responsible for 1/S of the overall memory. The number of slices is often a power of two and this will be assumed in what follows.

With reference now to FIG. 2A, there is shown a depiction of a sliced cache 210 consisting of two slices 212a and 212b. A per-slice cache data array 222a or 222b is used to hold those regions of memory mapped to the given cache slice. A per-slice cache directory 230a or 230b, is used to track the portions of memory mapped within each cache slice. Finally, per-slice control logic 226a and 226b manage outstanding coherence operations for the given cache slice. By having more than one cache slice, a larger number of outstanding operations can be accommodated than would be possible within a monolithic cache structure like that of FIG. 1C.

Additional addressing means are typically provided to efficiently manage sliced caches such as that show in FIG. 2A by apportioning the overall system memory space among the cache slices. In particular half of the overall system memory space is cached by each of the slices in cache 210. With reference now to FIG. 2B, there is shown a depiction of how the bits constituting a main memory address are interpreted to determine where a main memory location may be mapped within cache 210 for a system with a 64 bit address and a cache with 4096 congruence classes of 128 byte cache lines. The low order seven bits (bits 57 to 63) in field 203 indicate a byte within the cache line corresponding to this address. Since this field addresses bytes within a cache line, it is ignored when determining where the cache block may reside within the cache.

The next field, SS field 214, is the slice selector field. This field is used to determine which slice to allocate a given cache block memory address. If the SS field has a value of '0', the cache block memory address is allocated to slice 212a. Likewise, if the SS field has a value of '1', the cache block memory address is allocated to slice 212b. This mapping based on the SS field has the effect of causing cache block addresses ending with a hexadecimal value of '00' to be mapped to slice 212a and those cache block addresses ending with a hexadecimal value of '80' to be mapped to slice 212b. For a cache with more than two slices, additional bits would be included in the SS filed (two bits in the case of 4 slices) and would map the system memory into distinct subsets that are mapped to each slice (if a non-power of two number of slices is used, a hashing function is typically employed among several bits to select the slice to map a given cache block address to). For a given cache slice, congruence class address field 202 and tag field 201 serve the same functions as congruence class field 102 and tag field 101, as described above.

In the caching structures described above, a single directory entry is utilized for each entry within the cache data array. Cache directory arrays require a significant portion of circuit resources and it is advantageous to reduce this resource requirement where possible. To this end, so called "sectored caches" are often utilized. In a sectored cache, a single directory entry is employed to track the state of greater than one contiguous cache line sized block of memory. In a two-sector cache, a single directory entry will track the state of two contiguous blocks of system memory.

With reference now to FIG. 3A, there is shown a depiction of a directory entry for a two sector cache. The directory entry consists of a tag field 304 and two sector state fields 305a and 305b corresponding to the coherence state of each of the cache lines associated with the directory entry.

With reference now to FIG. 3B, there is shown a depiction of how the bits constituting a main memory address are interpreted to determine where a main memory location may be mapped within a cache for a system with a 64 bit address and a cache with 4096 congruence classes of 128 byte cache lines utilizing a two sectored cache. The low order seven bits (bits 57 to 63) in field 303 indicate a byte within the cache line corresponding to this address. Since this field addresses bytes within a cache line, it is ignored when determining where the cache block may reside within the cache.

The next bit in the address, T field 308, is used to select between sectors mapped to a given directory entry. By utilizing this low order bit, contiguous cache block regions of system memory are allocated to a given directory entry. In this case address that end with hexadecimal address 00 and 80 are mapped into sectors of a given directory entry.

The next twelve bits (bits 44 to 55) in congruence class address field 302 indicate the congruence class within the cache this memory address maps to. The cache block containing this address may reside in any of the N pairs of cache blocks within the addressed congruence class. Finally, the remaining bits of the address (bits 0 to 43) in tag field 301 are referred to as the "tag" of the memory block and identify the unique contiguous cache block pair. Tag field 301 contains one less bit than tag field 101 of FIG. 1A because directory entries in a two sector cache serve to map a two cache block sized region of system memory, instead of a single cache block entry.

A sectored cache provides a means of reducing the size of the directory but at a cost in efficiency of the cache. If both sectors of the various directory entries are not concurrently in use, the effective amount of memory that can be contained in the cache is reduced. In a pathological case where the access pattern touches only every other block in main memory, the effective amount of memory that can be cached is cut in half. In practice, the efficiency losses due to sectoring a cache are considerably less than this. It is often the case that a sectored cache of roughly equivalent area to a non-sectored cache will perform better (especially for larger lower-level caches).

SUMMARY OF THE INVENTION

Disclosed is a method and computer system for reducing the wiring congestion, required real estate, and access latency in a cache subsystem with a sectored and sliced lower cache by re-configuring sector-to-slice allocation and the lower cache addressing scheme. With this allocation, sectors having discontiguous addresses are placed within the same slice, and a reduced-wiring scheme is possible between two levels of lower caches based on this re-assignment of the addressable sectors within the cache slices. Additionally, the lower cache effective address tag is re-configured such that the address fields previously allocated to identifying the sector and the slice are switched relative to each other's location within the address tag. This re-allocation of the address bits enables direct slice addressing based on the indicated sector.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a block diagram representation of a data processing system with multiple level caches within, which features of the invention may advantageously be implemented;

DETAILED DESCRIPTION OF AN ILLUSTRATIVE EMBODIMENT

Figure 1A:
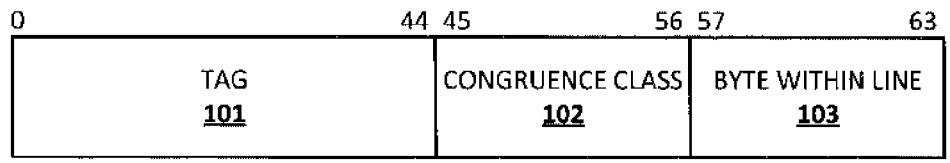
FIGS. 1A and 1B depict example representations of a cache effective address and cache directory entry, respectively, according to the prior art.
Figure 1B:
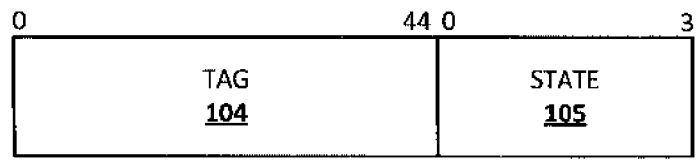
Figure 1C:
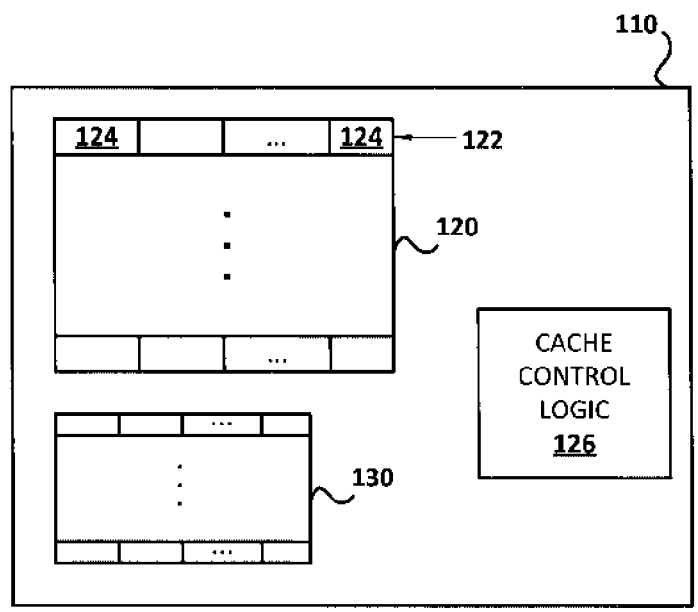
FIG. 1C is a block diagram representation of the internal components of a cache according to the prior art.

The present invention provides a method and computer system for reducing the wiring congestion, required real estate, and access latency in a cache subsystem with a sectored and sliced lower cache by re-configuring sector-to-slice allocation and the lower cache addressing scheme. With this allocation scheme, sectors having discontiguous addresses are placed within the same slice, and a reduced-wiring scheme is possible between two levels of lower caches based on the re-assignment of the addressable sectors within the cache slices. Additionally, the lower cache effective address tag is re-configured such that the address fields previously allocated to identifying the sector and the slice are switched relative to each other's location within the address tag. This re-allocation of the address bits enables direct slice addressing based on the indicated sector. For example, all addresses ending in 00Hex are sent to a first slice, while all addresses ending in 80Hex are sent to a second slice. The features described and illustrated herein may be applied to any two levels of the system's cache hierarchy.

Within the descriptions of the figures, similar elements are provided similar names and reference numerals as those of the previous figure(s). Where a later figure utilizes the element in a different context or with different functionality, the element is provided a different leading numeral representative of the figure number (e.g., 4xx for FIGS. 4 and 6xx for FIG. 6). The specific numerals assigned to the elements are provided solely to aid in the description and not meant to imply any limitations (structural or functional) on the invention.

With reference now to the figures and in particular with reference to FIG. 4, there is illustrated a high level block diagram of a multiprocessor data processing system (DPS) 400 having a multi-level cache hierarchy, within which the features of the present invention may be advantageously implemented. As depicted, data processing system 400 includes a number of processing units (chips) 401A, 401B, each coupled to system interconnect 440. System interconnect 440, which can comprise one or more buses or a crosspoint switch, serves as a conduit for communicating transactions between components on processing units 401A and 401B and other snoopers coupled to system interconnect 440 (e.g., memory 430).

Each processing unit 401A, 401B is an integrated circuit and may include one or more processors, of which CPU0 405A and CPU1 405B are illustrated. In addition to the registers, instruction flow logic and execution units utilized to execute program instructions (none of which are specifically shown), processor units 401A and 401B, each includes an associated level one (L1) cache (also not specifically shown), which temporarily stores instructions and data that are likely to be accessed by an associated processor (CPU 405A, 405B). The L1 caches may be unified caches that store both instruction and data (both referred to hereinafter simply as data), or alternatively, the L1 caches may be implemented as bifurcated instruction and data caches.

As illustrated in FIG. 4, data processing system 400 also includes system memory 430, coupled to interconnect 440. Memory 430 forms the lowest level of volatile data storage in a memory hierarchy, which includes one or more lower levels of cache memory, including Level two (L2) caches 420A/420B and shared L3 cache 425. Control busses 421A/421B serve to communicate commands and data between L2 caches 420A/420B and shared L3 cache 425. L2 caches 420a/420b and shared L3 cache 425 are utilized to stage data from system memory 430 to the processors (405A/405B). While the features of the invention are applicable to any two levels of cache hierarchy, further description herein will reference data transmission and associated wiring and addressing between L2 caches 420A/420B and shared L3 cache 425 implemented by means of interconnects 421A/421B.

Those skilled in the art will further appreciate that data processing system 400 can include many additional components, such as bridges to additional interconnects, I/O devices, non-volatile storage, and ports for connection to networks or attached devices. Because such additional components are not necessary for an understanding of the present invention, they are not illustrated in FIG. 4 or discussed further herein.

Figure 2A:
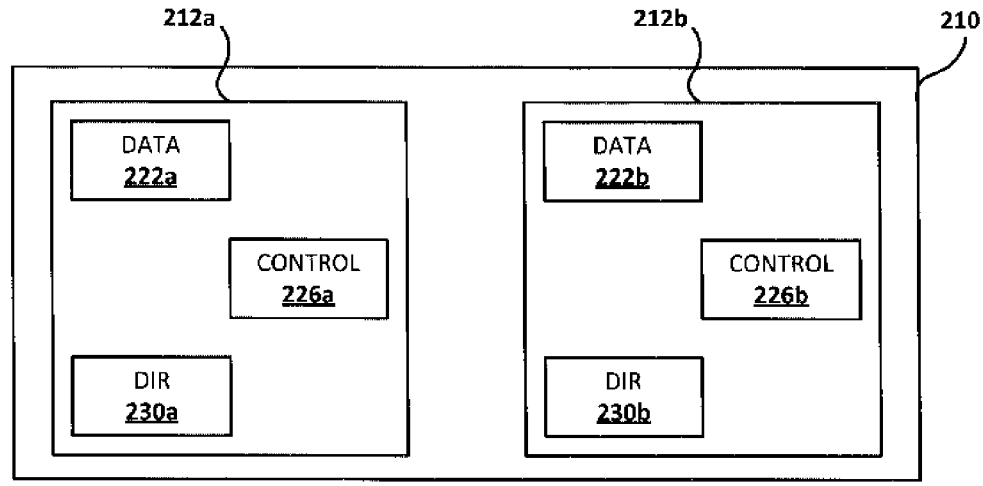
FIG. 2A is a block diagram representation of the internal components of a cache divided into two slices, according to the prior art.
Figure 2B:
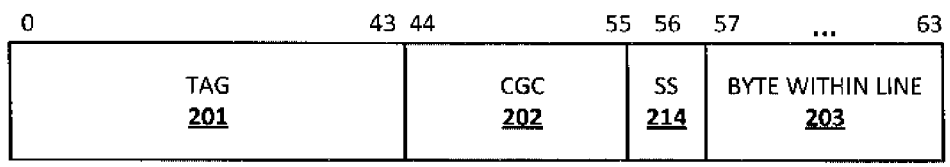
FIG. 2B depicts a prior art representation of a cache effective address utilized for addressing entries within a sliced cache such as the cache of FIG. 2A.
Figure 5A:
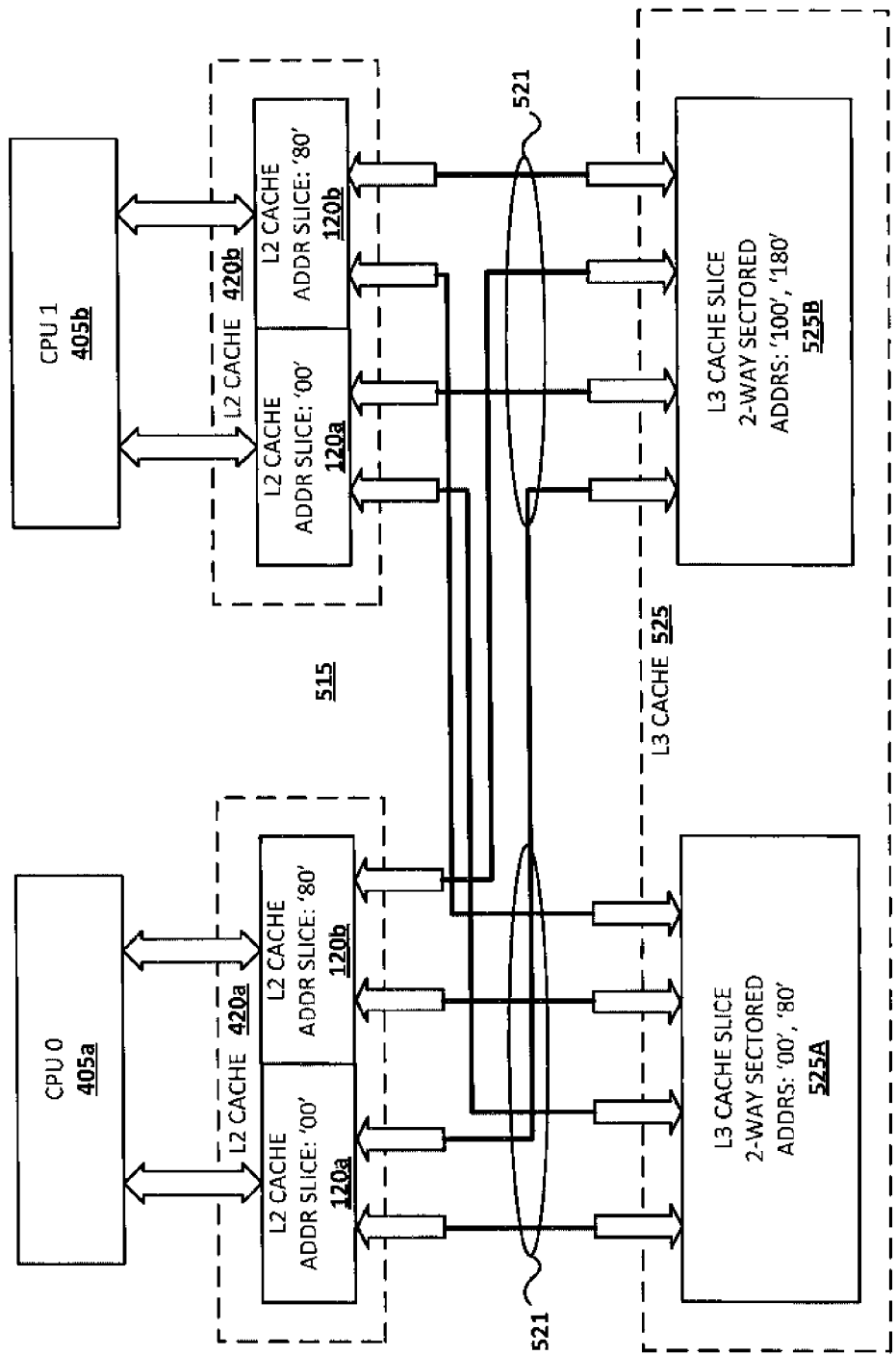
FIG. 5A is a block diagram representation of a cache subsystem with conventional inter-cache data bus wiring configuration to support a sliced, 2-way sectored lower level cache, using contiguous sector addressing, according to the prior art.

With reference now to FIG. 5A, there is depicted a prior art cache hierarchy implementation. In the referenced embodiment, CPU's 405A and 405B are connected to respective L2 caches 420A and 420B. Each L2 cache 420A/420B is a two slice, non-sectored cache with a cache line size of 128 bytes. A first slice (120A) of the L2 caches 420A/420B is used to map those cache line sized blocks of memory with a starting address ending in hexadecimal '00' (e.g. those 128 byte cache line blocks with bit 56 of the cache line address equal to '0'). Similarly, a second slice (120B) of the L2 caches 420A/420B is used to map those cache line sized blocks of memory with a starting address ending in hexadecimal '80' (e.g. bit 56 equals '1'). In this manner, as described above with respect to FIGS. 2A and 2B, the main memory of the multiprocessor data processing system is apportioned across the two slices of the L2 caches 420A/420B.

Figure 3A:
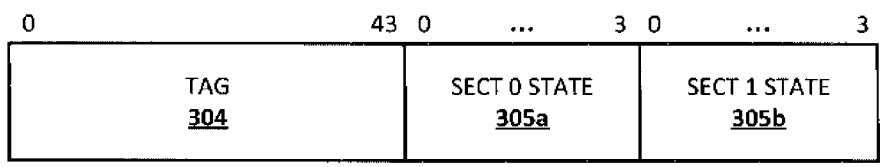
FIGS. 3A and 3B depict example representations of a cache directory entry and a cache effective address, respectively, for a two-way sectored cache, according to the prior art.
Figure 3B:
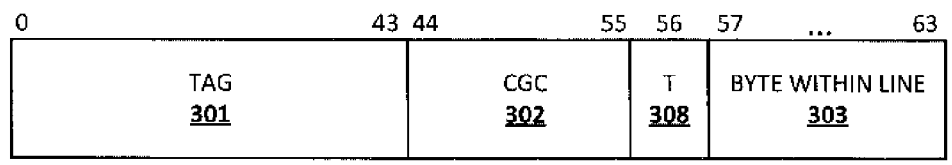

Similarly, L3 cache 525 is a two slice cache (slices 525A and 525B), but the caches slices are further two-way sectored. It is common to use a sectored cache for the larger lower levels of the cache hierarchy. The larger cache provides a larger commensurate savings in silicon area by being structured as a sectored cache. In prior art configurations, as described above in accordance with FIGS. 3A and 3B, the cache block sized regions of memory assigned to the different sectors within a cache entry are mapped to contiguous blocks within memory. In the depicted embodiment, therefore, starting cache block addresses ending with hexadecimal '00' and '80' are mapped to entries within slice 525A. In a similar fashion, starting cache block addresses ending with '100' and '180' are mapped to entries within cache slice 525B.

Figure 5B:
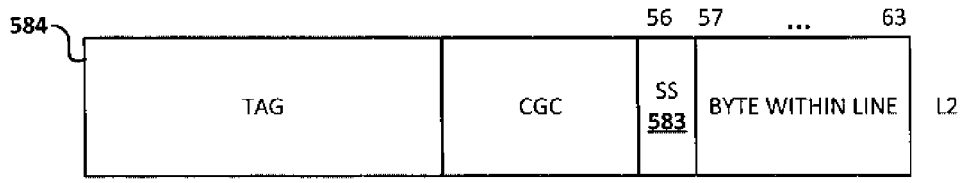
FIGS. 5B and 5C depict example representations of an L2 cache effective address and an L3 cache effective addresses, respectively, for the L2-to-L3 cache configuration illustrated by the cache subsystem of FIG. 5A, in accordance with the prior art.

In the configuration shown in FIG. 5B, each L2 cache slice must be connected to each L3 cache slice by means of buses 521 within interconnects 421A and 421B. This is due to the fact that a cache line ending with hexadecimal '00' may be found in either of L3 slice 525A or L3 slice 525B when address bit 55 of the cache line address is '0' (address ends in '000') or '1' (address ends in '100') respectively. Such a configuration leads to a complex and difficult to realize set of connections (buses and/or wiring 521).

Figure 5C:
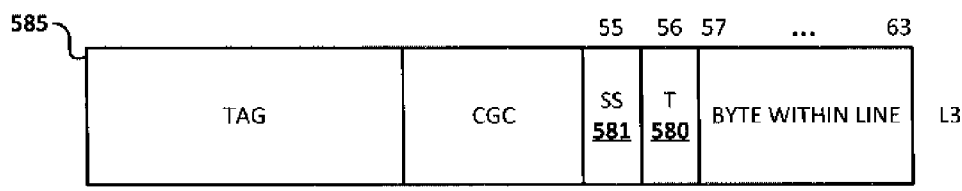

With reference now to FIGS. 5B and 5C, there are shown depictions of how the bits constituting a main memory address are interpreted by both the L2 and L3 caches of FIG. 5A. Address mapping 584 depicts the address mapping utilized by L2 caches 420A/420B. In this mapping, bit 56 (field 583) is utilized to select between cache slices 120A/120B. Address mapping 585 depicts the address mapping utilized by L3 cache 525. In keeping with prior art implementations, bit 56 (field 580) is utilized to select between addresses within a given cache entry. This assignment keeps the memory regions associated with sectors in a given cache entry contiguous. Bit 55 (field 581) is then utilized to select between cache slices.

Figure 6B:
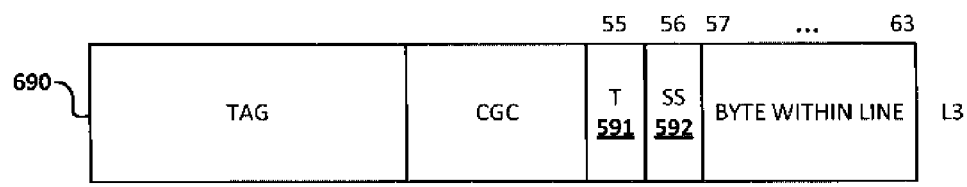
FIG. 6B depicts an example representation of an L3 cache effective addresses for the L3 cache configuration illustrated by the cache subsystem of FIG. 6A, in accordance with one embodiment of the invention.
Figure 6A:
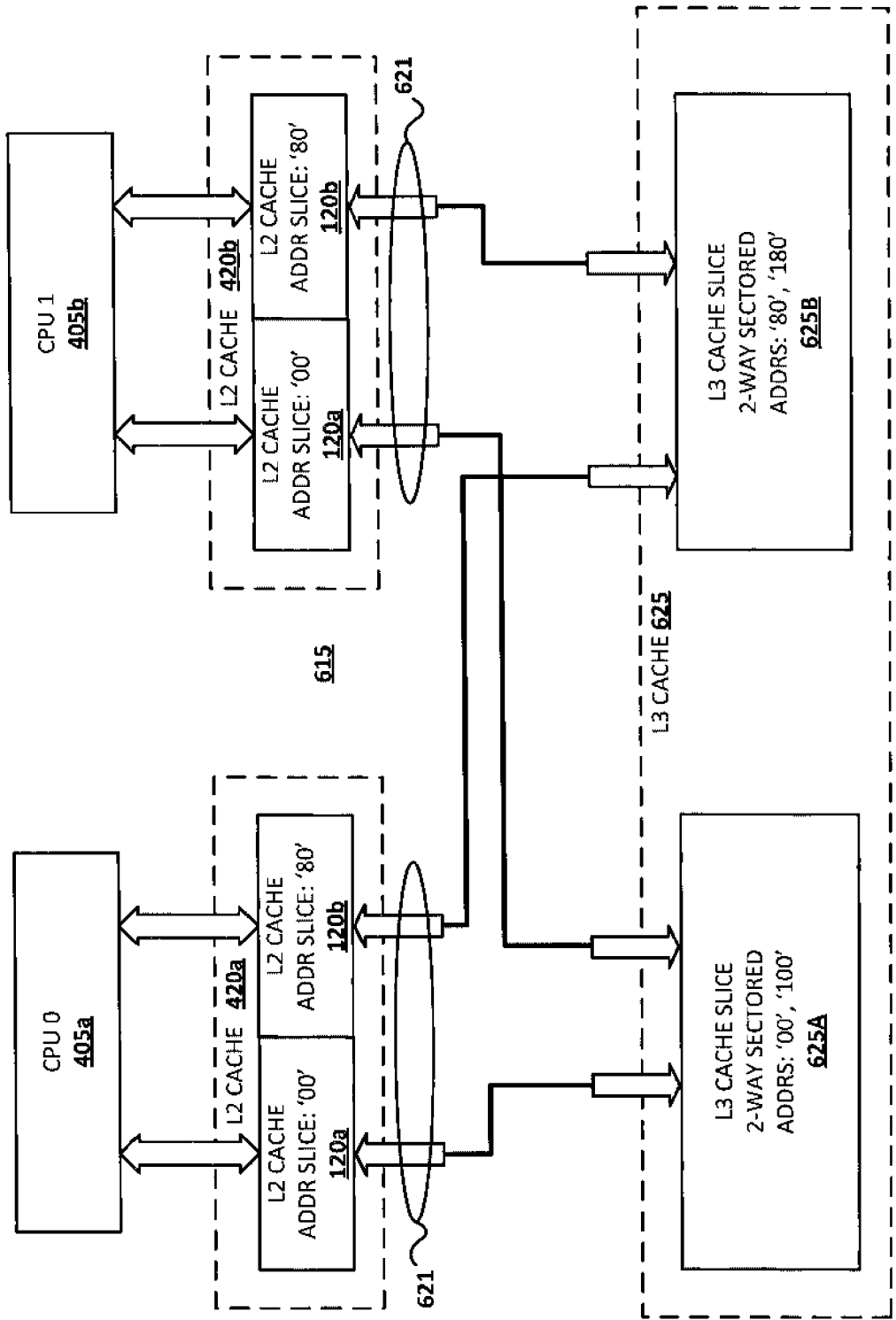
FIG. 6A is a block diagram representation of a cache subsystem with reduced inter-cache data bus wiring to support a sliced, 2-way sectored lower level cache, with discontiguous sector addressing, according to one embodiment of the invention.

With reference now to FIG. 6A, there is shown an alternative addressing scheme employed by the present invention in order to reduce wiring congestion between L2 and L3 caches. In the mechanism of the present invention, the sectors in the L3 cache slices are assigned to discontiguous addresses. In particular L3 slice 625A is assigned address that end in hexadecimal addresses '00' and '100'. Similarly L3 slice 625B is assigned addresses that end in hexadecimal addresses '80' and '180'. In this manner, an L2 cache slice (120A or 120B) need only communicate with one L3 slice as opposed to two slices in the prior art implementations. For example, addresses associated with L2 cache slice 120A can only be present in L3 cache slice 625A. Addresses that end in '00' hexadecimal must either end in '000' or '100'. Similar reasoning allows L2 caches slices 120B to be connected only to L3 cache slice 625B. This addressing scheme reduces the number of buses and/or wiring 621 required to implement interconnects 421A and 421B.

With reference now to FIG. 6B, there is shown a depiction of how the bits constituting a main memory address are interpreted by the L3 cache of FIG. 6A (the L2 cache mapping is identical to that utilized in FIG. 5B). Address mapping 690 depicts the address mapping utilized by L3 cache 625. In this mapping, bit 56 (field 592) is utilized to select the slice within L3 cache 625. By allocating bit 56 to selection of slices, discontiguous cache lines are assigned within a given cache slice. Bit 55 (field 591) is then utilized to control which addresses are mapped to given entries within the sectored cache line entries. This cache addressing mechanism allows for a greatly simplified interconnection between L2 caches 420A/420B and L3 cache 625.

The techniques illustrated in FIGS. 6A and 6B can be extended to handle lower level caches with greater numbers of sectors. With reference now to FIG. 7A, there is shown a data processing system 715 with two-slice, four-way sectored L3 cache 725. Data processing system 715 contains the same "any cache slice" to "any cache slice" interconnect (buses and/or wiring 521) as required in FIG. 5A. With reference now to FIG. 7B, there is shown an improved data processing system where L3 cache 725 is configured according to the teachings of the present invention and assigns discontiguous addresses to L3 cache slices 725A and 725B. In particular, L3 cache slice 725A contains caches lines with ascending addresses with bit 56 equal to a value of zero (0) and L3 cache slice 725B contains cache lines with ascending addresses with bit 56 equal to a value of one (1). By assigning addresses in this manner, cache wiring congestion may be reduced.

Figure 7C:
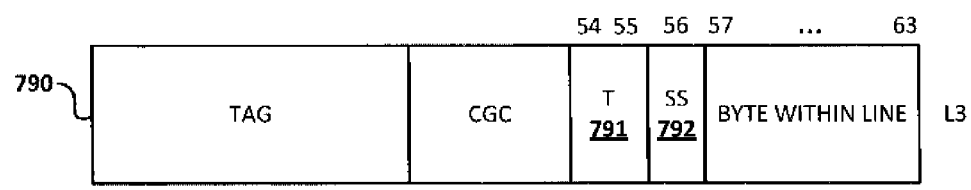
FIG. 7C depicts an example representation of an L3 cache effective addresses for the L3 cache configuration illustrated by the cache subsystem of FIG. 7B, in accordance with one embodiment of the invention.
Figure 7A:
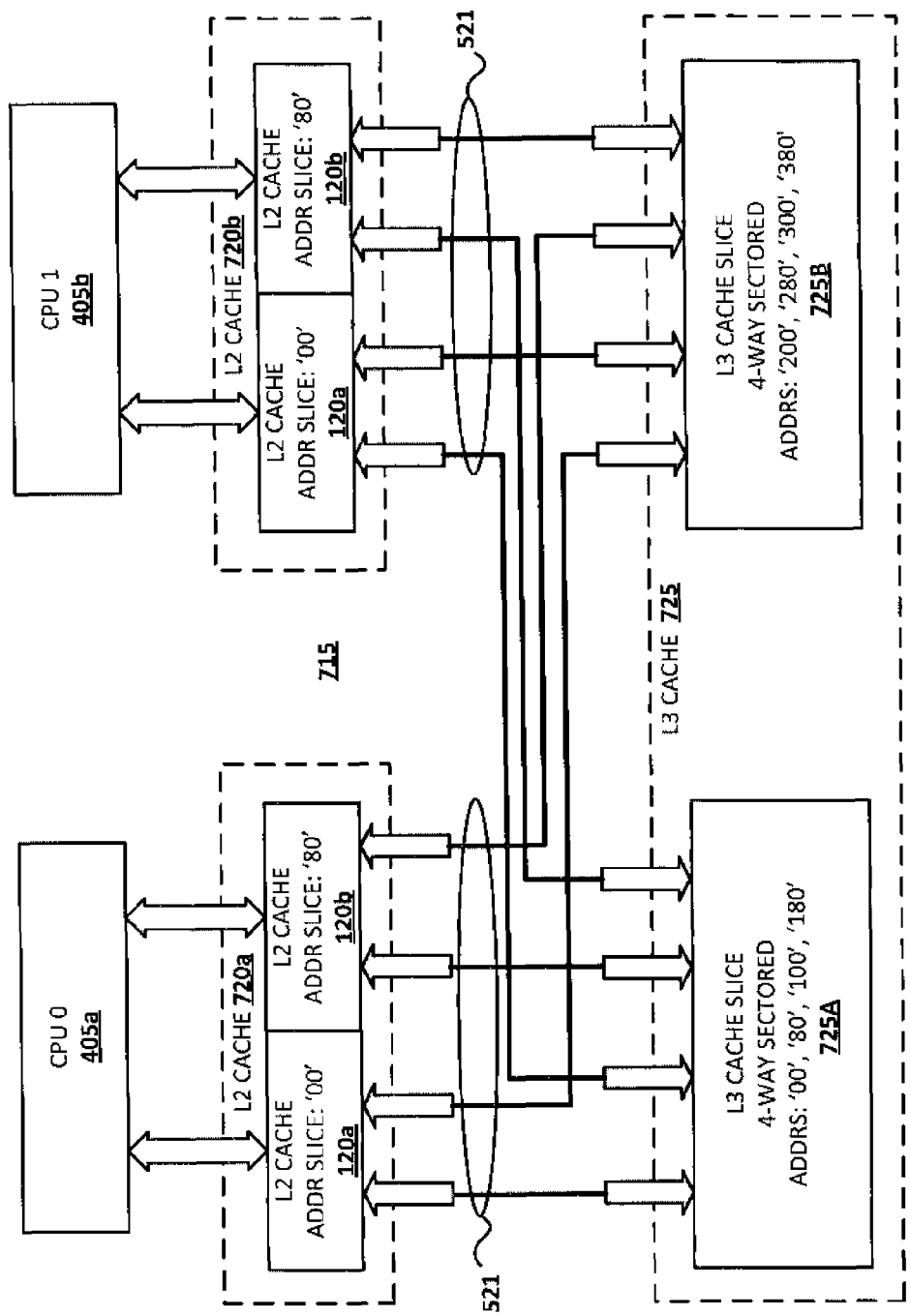
FIG. 7A is a block diagram representation of a cache subsystem with conventional inter-cache data bus wiring configuration to support a sliced, 4-way sectored lower level cache, using contiguous sector addressing, according to the prior art.
Figure 7B:
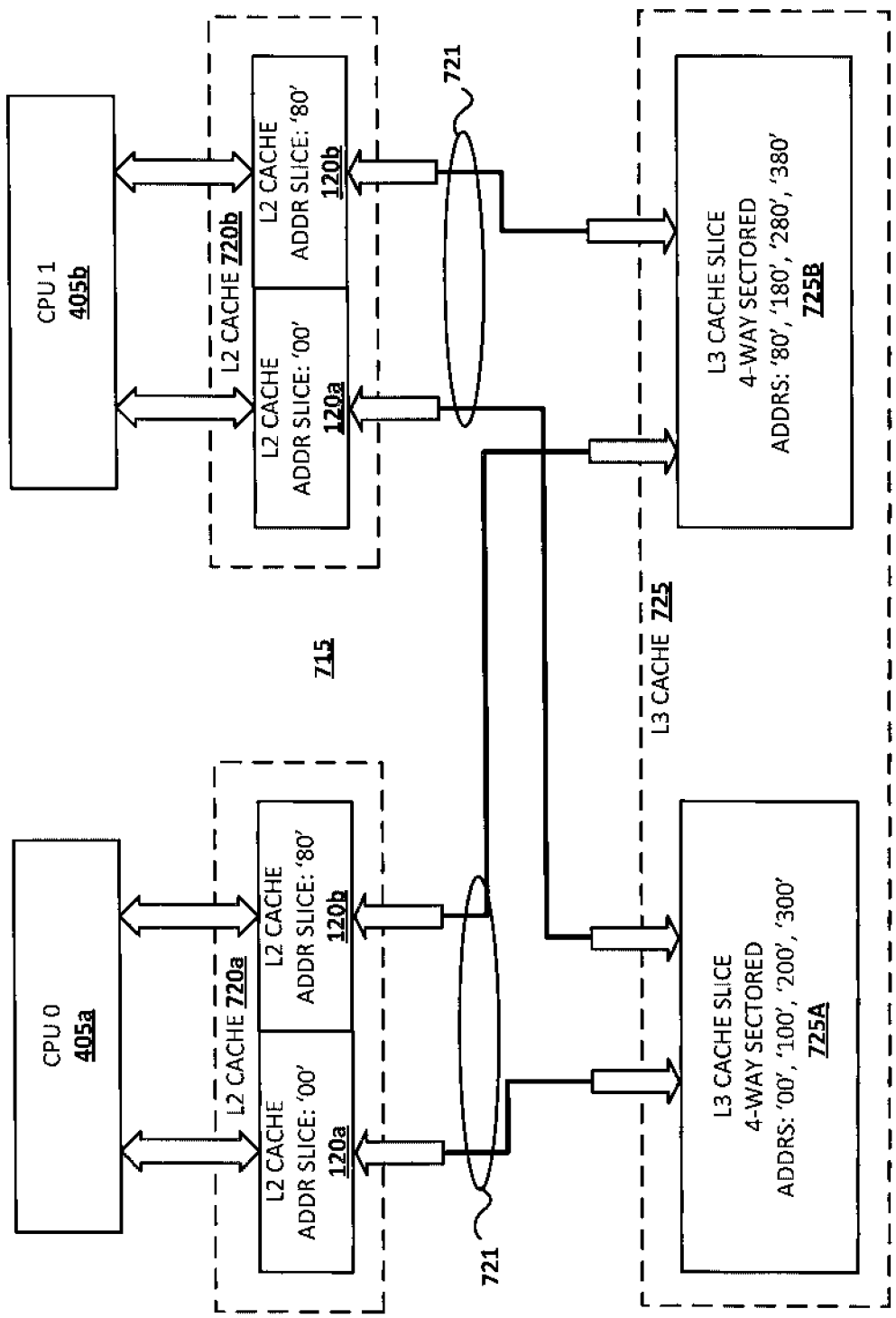
FIG. 7B is a block diagram representation of a cache subsystem with reduced inter-cache data bus wiring to support a sliced, 4-way sectored lower level cache, with discontiguous sector addressing, according to one embodiment of the invention.

With reference now to FIG. 7C, there is shown a depiction of how the bits constituting a main memory address are interpreted by the L3 cache of FIG. 7B (the L2 cache mapping is identical to that utilized in FIG. 5B). Address mapping 790 depicts the address mapping utilized by L3 cache 725. In this mapping, bit 56 (field 792) is utilized to select the slice within L3 cache 725. By allocating bit 56 to selection of slices, discontiguous cache lines are assigned within a given cache slice. Bits 54 and 55 (field 791) are then utilized to control which addresses are mapped to given entries within the sectored cache line entries. This cache addressing mechanism allows for a greatly simplified interconnection (buses and/or wiring 721) between L2 caches 720a/720b and L3 cache 725.

Figure 8A:
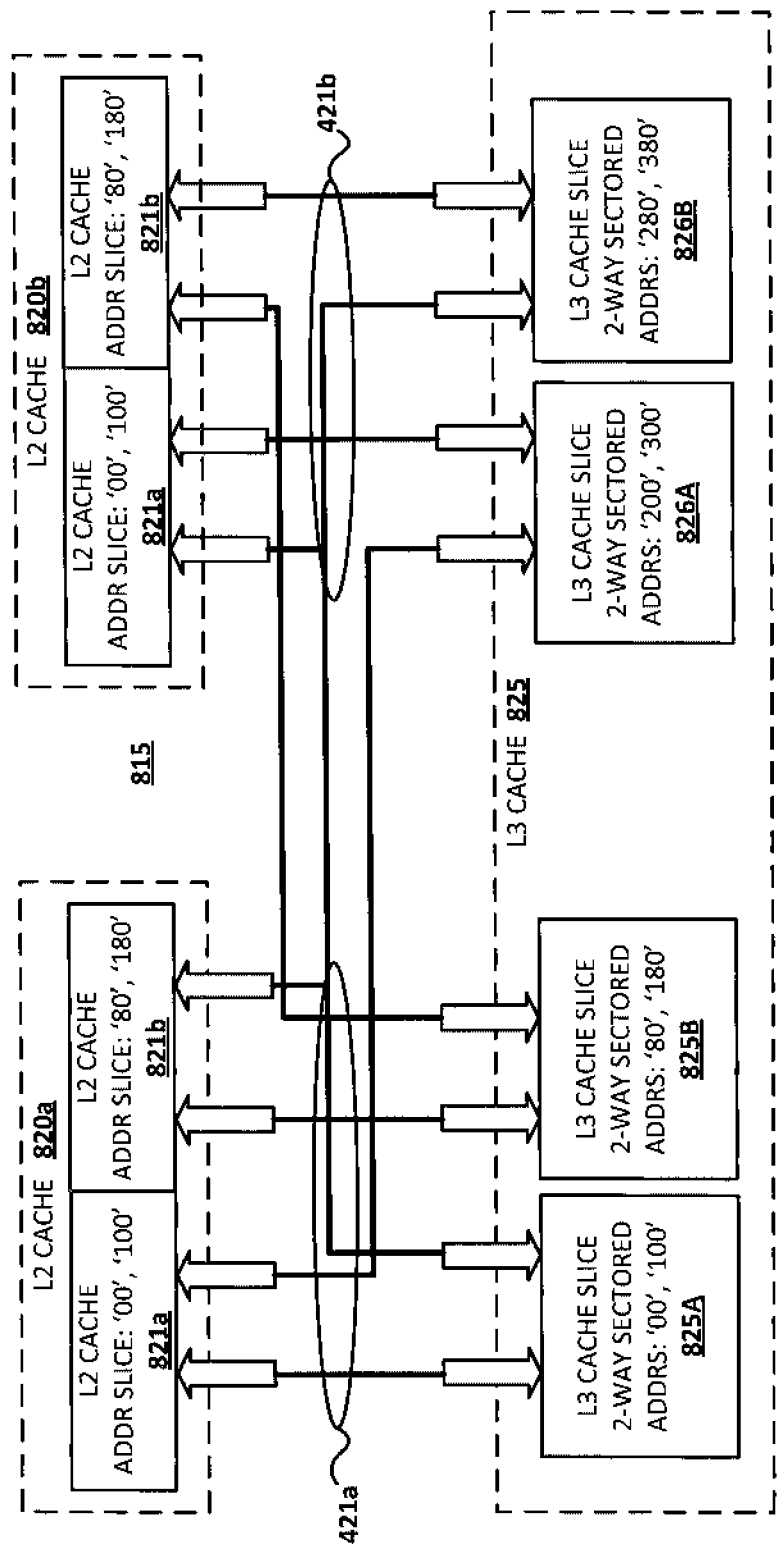
FIG. 8A a block diagram representation of a cache subsystem with reduced inter-cache data bus wiring to support connection between a sliced, 2-way sectored first lower level cache and a sliced, 4-way sectored second lower level cache, both with discontiguous sector addressing, according to one embodiment of the invention.

The teachings of the present invention can also be applied to reduce wiring congestion when both the higher level and lower level caches are sectored and sliced. For example, the cache arrangement of FIG. 8A shows the teachings of the present invention applied to a cache hierarchy 815 where the L2 caches 820A/820B are two-way sectored and two-way sliced, with an L3 cache 825 that is four-way sliced (slices 825A, 825B, 826A, 826B) and two-way sectored. In this structure, each L2 cache slice 821A/821B must connect to only two of the L3 cache slices instead of all four L3 cache slices (slices 825A, 825B, 826A, 826B).

Figure 8B:
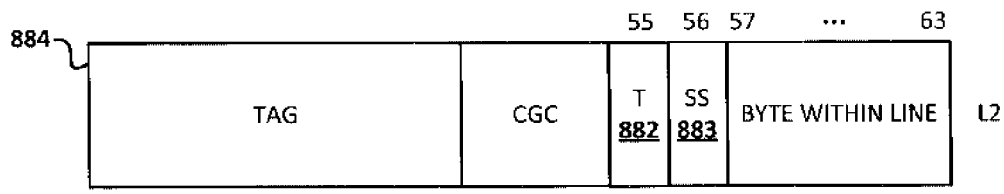
FIGS. 8B and 8C depict example representations of an L2 cache effective address and an L3 cache effective addresses, respectively, for the L2-to-L3 cache configuration illustrated by the cache subsystem of FIG. 8A, according to one embodiment of the invention.
Figure 8C:
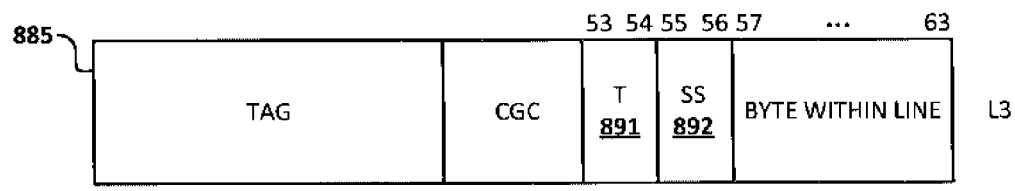

FIGS. 8B and 8C depicts the L2 and L3 address mappings for the cache configuration of FIG. 8A. The L2 cache mapping 884 utilizes bit 56 (field 883) as the slice selector and bit 55 (field 882) to determine sector addresses within a given sectored cache entry. Similarly, the L3 address mapping 885 utilizes bits 55 and 56 (field 892) as the slice selector and bits 53 and 54 (field 891) to determine sector address within a given sectored cache entry.

With the above described embodiments, the invention provides a data processing system having at least one processor and an improved memory subsystem that includes: a first level cache communicatively coupled to the first processor and having two or more cache slices; and a second level cache communicatively connected to the first level cache, where the second level cache has two or more second cache slices that are at least two-way sectored. The sector addresses within the two or more second cache slices are allocated in a discontiguous manner, such that a first sector is assigned to a first of the two or more second cache slices and a second sector, contiguous to the first sector, is assigned to a second of the two or more second cache slices.

An interconnect connects the first level cache to the second level cache to enable data exchange between the first and second level cache. The interconnect includes (1) a first data bus that communicatively connects a first slice of the first level cache to a corresponding first slice within the second level cache and (2) a second data bus that communicatively connects a second slice of the first level cache to a corresponding second slice within the second level cache.

In one embodiment, the data processing system and/or improved memory subsystem includes a next first level cache, similarly configured to the first level cache and which shares the second level cache with the first level cache. With this next first level cache, the interconnect further comprises (1) a third data bus that communicatively connects a first slice of the next first level cache to the corresponding first slice within the second level cache and (2) a fourth data bus that communicatively connects a second slice of the next first level cache to the corresponding second slice within the second level cache. Both the first level cache and the next first level cache source data from-and-to respective first slices to-and-from the corresponding first slice within the second level cache, and both first level caches source data from-and-to respective second slices to-and-from the corresponding second slice within the second level cache.

To support this new allocation scheme, the data processing system and/or improved memory subsystem includes a second level cache addressing protocol comprising cache-line address bit assignment logic, which completes the following functions: (1) exchanging an allocation of one or more sector bits with one or more slice selector bits within an address tag for a cache line, where the slice selector bits are utilized to indicate a slice within which a corresponding line of data is to be assigned within the second level cache and where the sector bits indicates a particular sector to which the cache line data is allocated; (2) automatically assigning first data having a first value within the one or more slice selector bits to the first slice within the second level cache indicated by the one or more slice bits; and (3) automatically assigning second data having a second value within the one or more slice selector bits to the second slice within the second level cache indicated by the one or more slice selector bits.

In one embodiment, the automatically assigning includes: checking a value of the slice selector bit within the cache line address; and when an address portion of the cache line address ends in a 0 bit value, assigning the cache line to the first slice within the second level cache. Also, when the address portion of the cache line address ends in a 1 bit value, assigning the cache line to the second slice within the second level cache. With these functions, the end bit of the address portion of the cache line address corresponds to the slice selector bit.

By assigning discontiguous addresses to the sectors in a sectored cache entry, the present invention achieves a reduction in inter-cache wiring and congestion. In contrast to prior art mechanisms which allocated sector entries to cache block sized regions of memory with ascending contiguous addresses, this assignment of sectors with discontiguous addresses allows for a given cache slice at a given level of the hierarchy to attach to as few other slices as possible.

The above described method of allocating sectors per slice allows reduced inter-cache wiring on the physical device, thus enabling use of smaller real estate on and off chip, even while increasing the size and reducing the latency of the L3 cache. The invention thus provides a highly desired development in cache technology.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
   at least one processor;
   a first level cache communicatively coupled to the at least one processor and divided into two or more cache slices based on an address hierarchy; and
   a second level cache communicatively connected to the first level cache, wherein said second level cache is divided into two or more second cache slices, wherein said two or more second cache slices are each at least two-way sectored, and wherein the sectors within each of the two or more second cache slices are allocated in a discontiguous manner according to the address hierarchy, such that a first sector is assigned to a first of the two or more second cache slices and a second sector, contiguous to the first sector, is assigned to a second of the two or more second cache slices, the second level cache further comprising a second level cache addressing protocol comprising cache-line address bit assignment logic that:
      reconfigures an address tag of a cache line of the second level cache by switching a location of a first address field within the address tag that is assigned to the two or more second cache slices with a location of a second address field within the address tag that is assigned to the sectors within each of the two or more second cache slices, wherein said first address field includes one or more slice bits that indicate a cache slice within which a corresponding line of data is to be assigned within the second level cache and said second address field includes one or more sector bits that indicate a particular sector to which the cache line data is allocated.

2. The data processing system of claim 1, further comprising:
   an interconnect for connecting the first level cache to the second level cache to enable data exchange between the first level cache and second level cache, wherein said interconnect includes (1) a first data bus that communicatively connects a first cache slice of the first level cache to a corresponding first cache slice within the second level cache and (2) a second data bus that communicatively connects a second cache slice of the first level cache to a corresponding second cache slice within the second level cache;

wherein data of a first sector within the first level cache is only allocated to a first cache slice of the two or more second cache slices within the second level cache, while data of a second sector within the first level cache is only allocated to a second cache slice of the two or more second cache slices within the second level cache.

3. The data processing system of claim 2, further comprising:
   a next first level cache, similarly configured to the first level cache and which shares the second level cache with the first level cache; and
   wherein the interconnect further comprises:
      a third data bus that communicatively connects a first cache slice of the next first level cache to a first cache slice of the second cache slices; and
      a fourth data bus that communicatively connects a second cache slice of the next first level cache to a second cache slice of the second cache slices;
      wherein the first level cache and the next first level cache both source data from and to respective first cache slices of the first level cache and the next first level cache to and from the first cache slice of the second cache slices; and
      wherein the first level cache and the next first level cache both source data from and to respective second cache slices of the first level cache and the next first level cache to and from the second cache slice of the second cache slices.

4. The data processing system of claim 1, the second level cache addressing protocol further comprising:
   automatically assigns first data having a first value within the one or more slice bits to a first cache slice within the second level cache indicated by the one or more slice bits; and
   automatically assigns second data having a second value within the one or more slice bits to a second cache slice within the second level cache indicated by the one or more slice bits.

5. The data processing system of claim 4, wherein said logic that automatically assigns comprises logic that:
   checks a value of the one or more slice bits within a cache line address of the cache line;
   in response to a memory address portion of the cache line address ending in a 0 bit value, assigns the cache line to the first cache slice within the second level cache; and
   in response to the memory address portion of the cache line address ending in a 1 bit value, assigns the cache line to the second cache slice within the second level cache;
   wherein a plurality of bits within a cache line address are utilized to represent the memory address portion of the cache line and a final one or more bits of the plurality of bits correspond to the one or more slice bits.

6. The data processing system of claim 4, wherein:
   the second level cache is N-way sectored, where N is a power of two; and
   each pair of contiguous sectors is allocated across the two or more second cache slices, such that no two contiguous sectors are allocated to a same cache slice.

7. The data processing system of claim 4, the second level cache addressing protocol further comprising logic that:
   assigns a plurality of bits within a cache line address that represent a memory address portion of the cache line; and
   assigns, from within the plurality of bits within the cache line address that represent the memory address portion of the cache line, a final one or more bits that correspond to the one or more slice bits;
   wherein the final one or more bits correspond to the memory address ending in 00Hex and 80Hex and said assigning is completed such that cache lines with the memory address portion ending in 00Hex are routed to the first cache slice of the second level cache and cache lines with the memory address portion ending in 80Hex are routed to the second cache slice of the second level cache.

8. The data processing system of claim 1, wherein the first level cache is a two-way sectored cache with two cache slices, and said second level cache is a two-way sectored cache with four cache slices, said system further comprising:
   an interconnect for connecting the first level cache to the second level cache to enable data exchange between the first level cache and second level cache, wherein each sector within a first cache slice of the first level cache is allocated to a different sector and a different cache slice within the second level cache, such that sequential sectors within a cache slice of the first level cache are assigned to different cache slices within the second level cache and sectors from the first cache slice and the second cache slice of the first level cache are allocated to a different cache slice within the second level cache.

9. A memory subsystem comprising:
   a first level cache communicatively coupled to at least one first processor and divided into two or more cache slices based on an address hierarchy; and
   a second level cache communicatively connected to the first level cache, wherein said second level cache is divided into two or more second cache slices, wherein said two or more second cache slices are each at least two-way sectored, and wherein the sectors within each of the two or more second cache slices are allocated in a discontiguous manner according to the address hierarchy, such that a first sector is assigned to a first of the two or more second cache slices and a second sector, contiguous to the first sector, is assigned to a second of the two or more second cache slices, the second level cache further comprising a second level cache addressing protocol comprising cache-line address bit assignment logic that:
      reconfigures an address tag of a cache line of the second level cache by switching a location of a first address field within the address tag that is assigned to the two or more second cache slices with a location of a second address field within the address tag that is assigned to the sectors within each of the two or more second cache slices, wherein said first address field includes one or more slice bits that indicate a cache slice within which a corresponding line of data is to be assigned within the second level cache and said second address field includes one or more sector bits that indicate a particular sector to which the cache line data is allocated.

10. The memory subsystem of claim 9, further comprising:
    an interconnect for connecting the first level cache to the second level cache to enable data exchange between the first level cache and second level cache, wherein said interconnect includes (1) a first data bus that communicatively connects a first cache slice of the first level cache to a corresponding first cache slice within the second level cache and (2) a second data bus that communicatively connects a second cache slice of the first level cache to a corresponding second cache slice within the second level cache;
    wherein data of a first sector within the first level cache is only allocated to a first cache slice of the two or more second cache slices within the second level cache, while data of a second sector within the first level cache is only allocated to a second cache slice of the two or more second cache slices within the second level cache.

11. The memory subsystem of claim 10, further comprising:
   a next first level cache, similarly configured to the first level cache and which shares the second level cache with the first level cache; and
   wherein the interconnect further comprises:
      a third data bus that communicatively connects a first cache slice of the next first level cache to a first cache slice of the second cache slices; and
      a fourth data bus that communicatively connects a second cache slice of the next first level cache to a second cache slice of the second cache slices;
      wherein the first level cache and the next first level cache both source data from and to respective first cache slices of the first level cache and the next first level cache to and from the first cache slice of the second cache slices; and
      wherein the first level cache and the next first level cache both source data from and to respective second cache slices of the first level cache and the next first level cache to and from the second cache slice of the second cache slices.

12. The memory subsystem of claim 9, the second level cache addressing protocol further comprising logic that:
   automatically assigns first data having a first value within the one or more slice bits to a first cache slice within the second level cache indicated by the one or more slice bits; and
   automatically assigns second data having a second value within the one or more slice bits to a second cache slice within the second level cache indicated by the one or more slice bits.

13. The memory subsystem of claim 12, wherein said logic that automatically assigns comprises logic that:
   checks a value of the one or more slice bits within a cache line address of the cache line;
   in response to a memory address portion of the cache line address ending in a 0 bit value, assigns the cache line to the first cache slice within the second level cache; and
   in response to the memory address portion of the cache line address ending in a 1 bit value, assigns the cache line to the second cache slice within the second level cache;
   wherein a plurality of bits within a cache line address are utilized to represent the memory address portion of the cache line and a final one or more bits of the plurality of bits correspond to the one or more slice bits.

14. The memory subsystem of claim 12, wherein:
   the second level cache is N-way sectored, where N is a power of two; and
   each pair of contiguous sectors is allocated across the two or more second cache slices, such that no two contiguous sectors are allocated to a same cache slice.

15. The memory subsystem of claim 12, the second level cache addressing protocol further comprising logic that:
   assigns a plurality of bits within a cache line address that represent a memory address portion of the cache line; and
   assigns, from within the plurality of bits within the cache line address that represent the memory address portion of the cache line, a final one or more bits that correspond to the one or more slice bits;
   wherein the final one or more bits correspond to the memory address ending in 00Hex and 80Hex and said assigning is completed such that cache lines with the memory address portion ending in 00Hex are routed to the first cache slice of the second level cache and cache lines with the memory address portion ending in 80Hex are routed to the second cache slice of the second level cache.

16. The memory subsystem of claim 9, wherein the first level cache is a two-way sectored cache with two cache slices, and said second level cache is a two-way sectored cache with four cache slices, said system further comprising:
   an interconnect for connecting the first level cache to the second level cache to enable data exchange between the first level cache and second level cache, wherein each sector within a first cache slice of the first level cache is allocated to a different sector and a different cache slice within the second level cache, such that sequential sectors within a cache slice of the first level cache are assigned to different cache slices within the second level cache and sectors from the first cache slice and the second cache slice of the first level cache are allocated to a different cache slice within the second level cache.

17. A method for allocating data to an N-way sectored lower level cache with two or more slices, said method comprising:
   reconfiguring an address tag of a cache line of a second level cache by switching a location of a first address field within the address tag that is assigned to two or more second cache slices with a location of a second address field within the address tag that is assigned to one or more sectors within each of the two or more second cache slices of one or more sector bits relative to one or more cache slice selector bits within an address tag for a cache line, said first address field includes one or more slice bits that indicate a cache slice within which a corresponding line of data is to be assigned within the second level cache and said second address field includes one or more sector bits that indicate a particular sector to which the cache line data is allocated based on an address hierarchy;
   automatically assigning first data having a first value within the one or more slice bits to a first cache slice within the second level cache indicated by the one or more slice bits; and
   automatically assigning second data having a second value within the one or more slice bits to a second cache slice within the second level cache indicated by the one or more slice bits;
   wherein data allocated to different sequentially addressed sectors are assigned in a discontiguous manner to different cache slices within the lower level cache, according to the address hierarchy;
   wherein the second level cache is communicatively connected to a first level cache, wherein said second level cache is divided into two or more second cache slices, wherein said two or more second cache slices are each at least two-way sectored, and wherein the sectors within each of the two or more second cache slices are allocated in a discontiguous manner according to the address hierarchy, such that a first sector is assigned to a first of the two or more second cache slices and a second sector, contiguous to the first sector, is assigned to a second of the two or more second cache slices; and
   wherein the first level cache is communicatively coupled to at least one processor and is divided into two or more cache slices based on an address hierarchy.

18. The method of claim 17, wherein said automatically assigning comprises:
   checking a value of the one or more slice selector bits within a cache line address of the cache line;
   in response to a memory address portion of the cache line address ending in a 0 bit value, assigning the cache line to the first cache slice within the second level cache; and
   in response to the memory address portion of the cache line address ending in a 1 bit value, assigning the cache line to the second cache slice within the second level cache;
   wherein a plurality of bits within a cache line address are utilized to represent the memory address portion of the cache line and a final one or more bits of the plurality of bits correspond to the one or more slice bits.

19. The method of claim 17, wherein:
   the second level cache is N-way sectored, where N is a power of two; and
   said assigning assigns the cache lines to sectors such that each pair of contiguous sectors is allocated across the two or more second cache slices, such that no two contiguous sectors are allocated to a same cache slice.

20. The method of claim 17, further comprising:
   assigning a plurality of bits within a cache line address that represent a memory address portion of the cache line; and
   assigning, from within the plurality of bits within the cache line address that represent the memory address portion of the cache line, a final one or more bits that correspond to the one or more slice bits;
   wherein the final one or more bits correspond to a memory address ending in 00Hex and 80Hex and said assigning comprises:
      checking a value of the cache slice selector bit of the cache line address;
      in response to the memory address portion of the cache line address ending in 00Hex, placing the cache line data in the first cache slice; and
      in response to the memory address portion of the cache line address ending in 80Hex, placing the cache line data in the second cache slice.

* * * * *